US009215012B2

(12) United States Patent
Holder et al.

(10) Patent No.: US 9,215,012 B2
(45) Date of Patent: Dec. 15, 2015

(54) METHOD AND SYSTEM FOR USING ORTHOGONAL SPACE PROJECTIONS TO MITIGATE INTERFERENCE

(71) Applicant: Propagation Research Associates, Inc., Marietta, GA (US)

(72) Inventors: Ernest Jefferson Holder, Canton, GA (US); George Martin Hall, Sebastian, FL (US)

(73) Assignee: Propagation Research Associates, Inc., Marietta, GA (US)

( * ) Notice: Subject to any disclaimer, the term of this patent is extended or adjusted under 35 U.S.C. 154(b) by 156 days.

(21) Appl. No.: 13/984,058

(22) PCT Filed: Apr. 26, 2013

(86) PCT No.: PCT/US2013/038537
§ 371 (c)(1),
(2) Date: Aug. 7, 2013

(87) PCT Pub. No.: WO2013/163629
PCT Pub. Date: Oct. 31, 2013

(65) Prior Publication Data
US 2014/0128002 A1 May 8, 2014

Related U.S. Application Data

(60) Provisional application No. 61/779,531, filed on Mar. 13, 2013, provisional application No. 61/638,934, filed on Apr. 26, 2012.

(51) Int. Cl.
*H04B 1/7107* (2011.01)
*H04B 7/04* (2006.01)
*H04B 15/00* (2006.01)
*H04B 1/7097* (2011.01)

(52) U.S. Cl.
CPC .............. *H04B 15/00* (2013.01); *H04B 1/7097* (2013.01)

(58) Field of Classification Search
CPC ........................... H04B 1/1027; H04B 1/7107
See application file for complete search history.

(56) References Cited

U.S. PATENT DOCUMENTS 6,697,633 B1 2/2004 Dogan et al.
6,711,219 B2 3/2004 Thomas et al.
(Continued)

OTHER PUBLICATIONS

Louis L. Scharff and Michael L. McCloud, Blind Adaptation of Zero Forcing Projections and Oblique Psuedo-Inverses for Subspace Detection and Estimation When Interference Dominates Noise, IEEE Transactions on Signal Processing, Dec. 2002, pp. 2938-2946, vol. 50, No. 12, IEEE.

(Continued)

*Primary Examiner* — Andrew Wendell
*Assistant Examiner* — Cindy Trandai
(74) *Attorney, Agent, or Firm* — Robert A. Blaha; Smith Risley Tempel Santos LLC

(57) ABSTRACT

Systems and methods are provided for mitigating natural and man-made interference through the use of one or more orthogonal, or nearly-orthogonal, projections of the received signal, which is assumed to be contaminated with interference, into one or more orthogonal projection spaces based on properties of the signal of interest. Once separated into orthogonal projection space(s), the system and method use information contained in the orthogonal projection space(s) to separate the signal of interest, or target signal, from the interference and to mitigate the interference.

32 Claims, 2 Drawing Sheets

(56) References Cited

U.S. PATENT DOCUMENTS

| | | |
|---|---|---|
| 6,856,945 B2 | 2/2005 | Thomas et al. |
| 7,099,377 B2 | 8/2006 | Berens et al. |
| 7,110,434 B2 | 9/2006 | Currivan et al. |
| 7,120,657 B2 | 10/2006 | Ricks et al. |
| 7,136,410 B2 | 11/2006 | Choi et al. |
| 7,167,884 B2 | 1/2007 | Picciolo et al. |
| 7,177,351 B2 | 2/2007 | Kadous |
| 7,333,919 B2 | 2/2008 | Hayward et al. |
| 7,359,465 B2 | 4/2008 | Olson et al. |
| 7,420,509 B2 | 9/2008 | Minkoff |
| 7,430,253 B2 | 9/2008 | Olson et al. |
| 7,463,609 B2 | 12/2008 | Scharf et al. |
| 7,626,542 B2 | 12/2009 | Kober et al. |
| 7,643,538 B2 | 1/2010 | Currivan et al. |
| 7,660,231 B2 | 2/2010 | Tulino |
| 7,907,912 B2 | 3/2011 | Nam et al. |
| 8,121,177 B2 | 2/2012 | Narayan et al. |
| 2002/0152253 A1* | 10/2002 | Ricks et al. .................. 708/520 |
| 2002/0197958 A1* | 12/2002 | Collins et al. .................. 455/63 |
| 2003/0098697 A1* | 5/2003 | Tanaka .......................... 324/637 |
| 2003/0189972 A1* | 10/2003 | Berens et al. ................. 375/148 |
| 2005/0007278 A1* | 1/2005 | Anson et al. .................. 342/451 |
| 2005/0180364 A1 | 8/2005 | Nagarajan et al. |
| 2005/0253579 A1* | 11/2005 | Block et al. ................... 324/307 |
| 2006/0153283 A1* | 7/2006 | Scharf et al. .................. 375/148 |
| 2006/0229051 A1 | 10/2006 | Narayan et al. |
| 2008/0007454 A1* | 1/2008 | Minkoff ....................... 342/379 |
| 2009/0122866 A1* | 5/2009 | Crawford et al. ........ 375/240.16 |
| 2009/0141775 A1* | 6/2009 | Kober et al. .................. 375/148 |
| 2011/0069796 A1 | 3/2011 | Scharf et al. |
| 2012/0016921 A1 | 1/2012 | Davenport et al. |

OTHER PUBLICATIONS

Sofiene Affes, Henrik Hansen and Paul Mermelstein, Interference Subspace Rejection: A Framework for Multiuser Detection in Wideband CDMA, IEEE Journal on Selected Areas in Communications, Feb. 2002, pp. 287-302, vol. 20, No. 2, IEEE.

Jonathan Landon, Brian D. Jeffs and Karl F. Warnick, Model-Based Subspace Projection Beamforming for Deep Interference Nulling, IEEE Transactions on Signal Processing, Mar. 2012, pp. 1215-1228, vol. 60, No. 3, IEEE.

* cited by examiner

METHOD AND SYSTEM FOR USING ORTHOGONAL SPACE PROJECTIONS TO MITIGATE INTERFERENCE

CROSS-REFERENCE TO RELATED APPLICATIONS

This application is a nonprovisional application claiming the benefit of the filing date of a provisional application having application Ser. No. 61/638,934, filed on Apr. 26, 2012 and entitled "A Method and Apparatus for the Mitigation of Signal Interference," and of the filing date of a provisional application having application Ser. No. 61/779,531, filed on Mar. 13, 2013 and entitled "Orthogonal Space Projection For Mitigation Interference," both of which are incorporated herein by reference in their entireties.

TECHNICAL FIELD OF THE INVENTION

The invention relates to mitigating of interfering electromagnetic signals. More particularly, the invention relates to methods and systems for dynamically identifying and mitigating interfering electromagnetic signals in real-time by using one or more orthogonal projections of a received signal to isolate and mitigate the interference signals.

BACKGROUND OF THE INVENTION

Electromagnetic interference occurring in a receiver modifies or disrupts a target electromagnetic signal in the receiver, resulting in degradation of the target signal. The interference may be natural or man-made. Natural electromagnetic interference sources include thermal noise sources, pulses emitted by lightning, astronomical sources, etc. Man-made electromagnetic interference sources may be unintentional sources, such as interference generated by industrial processes and household appliances, or intentional sources, such as jammers designed to reduce the effectiveness of a system, such as a cell phone system or a radar jammer system.

Such interference can seriously degrade the performance of a system that is configured to receive particular signals. For example, for a radar or sonar system, interference can result in a failure to detect an imminent threat. For navigation and position receivers, interference can result in loss of accuracy or outright jamming. For communication systems, interference can increase the bit error rate.

Work on mitigating electromagnetic interference dates back to the earliest days of radio. Until approximately 1950, the majority of the work consisted of means and techniques for minimizing natural and mutual interference. Post 1950, efforts began in earnest on mitigating the effect of purposeful, man-made interference.

Known techniques and systems for mitigating interference typically use the ergodic, or statistical, properties of the interference with respect to the desired signal to identify the interference and the desired signal and to create a weighting function that optimizes a cost function. Separating the signal from the interference in this manner requires averaging the signal over a time period in order to estimate signal statistics. The averaging time period is long relative to the reciprocal bandwidth of the desired signal and the interference signal. Requiring the summation over a relatively long time period assumes that the statistics of both the interference and the desired signal are stationary for the time period, which is not always a valid assumption and can lead to undesirable mitigation results.

Accordingly, a need exists for a method and system for mitigating interference that overcome the shortcomings of known systems and methods.

SUMMARY OF THE INVENTION

The invention is directed to systems and methods for mitigating electromagnetic interference. In accordance with an illustrative embodiment, the system comprises M antenna elements and M electrical processing circuits electrically coupled to M respective antenna elements of the array, where M is a positive integer that is great than or equal to 1. Each electrical processing circuit receives an electrical signal received by the respective antenna element and performs at least a first projection operation on the respective received electrical signal to project the received electrical signal into a respective orthogonal projection space that is orthogonal to, or nearly orthogonal to, a respective reference signal. A respective target signal and a respective interference signal are present in the respective received electrical signal, whereas the interference signal, but not the target signal, is present in the respective orthogonal projection space. At least one of the M electrical processing circuits performs a separation method that processes at least the orthogonal projection spaces to separate the interference signals from the target signals and to mitigate the interference signals.

In accordance with an illustrative embodiment, the method comprises:

with an array of M spatially-separated antenna elements, receiving electrical signals;

with M electrical processing circuits electrically coupled to M respective antenna elements of the array of antenna elements:

receiving an electrical signal from the respective antenna element in response to the respective antenna element receiving a respective electrical signal, performing at least a first projection operation on the respective received electrical signal to project the received electrical signal into a respective orthogonal projection space that is orthogonal to, or nearly orthogonal to, a respective reference signal, wherein a respective target signal and a respective interference signal are present in the respective received electrical signal, and wherein the interference signal, but not the target signal, is present in the respective image space, and with at least one of the M electrical processing circuits, performing a separation method that processes at least the orthogonal projection spaces to separate the interference signals from the target signals and to mitigate the interference signals.

The invention also is directed to a non-transitory computer-readable medium having code thereon for execution by a processor. The code includes first, second and third code segments. The first code segment receives a plurality of electrical signals that have been received by respective antenna elements of an array of M spatially-separated antenna elements, where M is a positive integer that is great than or equal to 1. The second code segment projects each received electrical signal into an orthogonal projection space that is orthogonal to, or nearly orthogonal to, a respective reference signal. A respective target signal and a respective interference signal are present in the respective received electrical signal, whereas the interference signal, but not the target signal, is present in the respective orthogonal projection space. The third code segment performs a separation method that processes at least the orthogonal projection spaces to separate the interference signals from the target signals and to mitigate the interference signals.

These and other features and advantages of the invention will become apparent from the following description, drawings and claims.

DETAILED DESCRIPTION OF AN ILLUSTRATIVE EMBODIMENT

Figure 1:
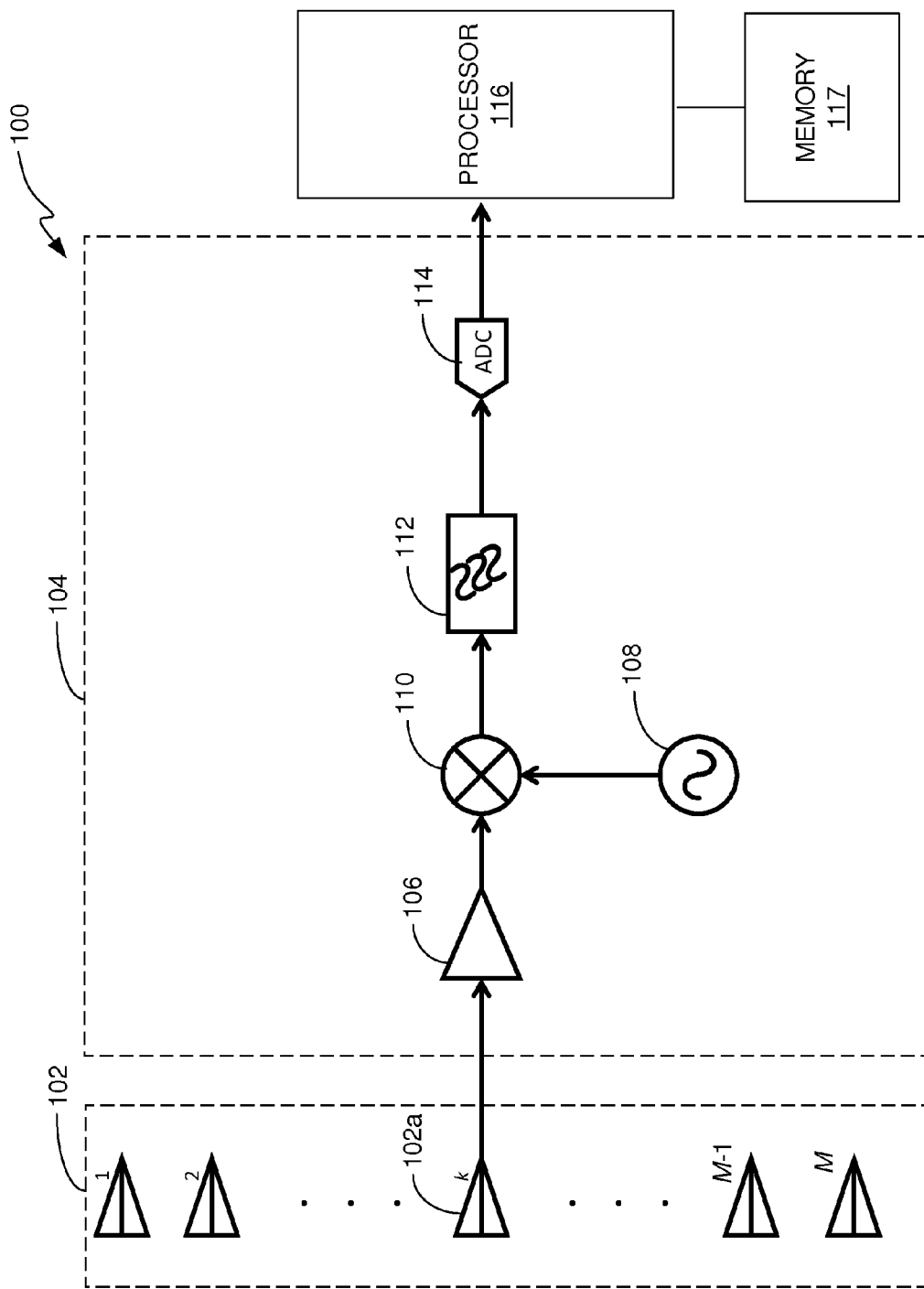
FIG. 1 is a block diagram of one illustrative embodiment of an OSP system designed to mitigate interference in a phased array radar configuration.

The invention is directed to various embodiments of systems and methods for mitigating natural and man-made interference through the use of one or more orthogonal, or nearly-orthogonal, subspace projections of the received signal, which is assumed to be contaminated with interference, into one or more image, or separation, spaces based on properties of the signal of interest. Once separated into image space(s), the system and method use information contained in the image space(s) to separate the signal of interest, or target signal, from the interference and to mitigate the interference. The projection operation(s) separates the received signal, which includes the target signal and interference, from the interference by projecting the received signal into an orthogonal subspace that is orthogonal, or nearly orthogonal, to the target signal. By definition, the portion of the interference that remains after this orthogonal projection has been performed does not contain a significant amount of signal energy. A second projection operation that is matched to the target signal may also be performed on the received signal, or on the received signal after it has had the interference mitigated, but this is not always necessary or useful.

Some examples of signal spaces that are useful for the projection operation are code spaces, frequency spaces, and time spaces. Some examples of signal spaces that are useful for image separation are angle, range and frequency. There are several advantages to the orthogonal space projection (OSP) approach described herein. One advantage is that the use of orthogonal projections produces a representation of the interference that is truly isolated from the target signal in that the projection containing the interference is orthogonal to, or nearly orthogonal to, the target signal. This enables subsequent operations to be performed that optimally or nearly optimally remove the interference. Another advantage is that the projection operation can be orthogonal to a large class of target signals, which makes it well suited for removing interference from multiple target signals. Another advantage is that the orthogonal projection requires only one projection processing interval, which may be, for example, the compression interval of a spread spectrum signal. This obviates the need to perform time averaging processes that depend on the ergodic nature of the interference with respect to desired signal to identify the interference and the desired signal and then create a weighting function that optimizes a cost function.

Various illustrative embodiments are described herein, including, for example, embodiments that use orthogonal or nearly orthogonal projections both in modulation-angle subspaces as well as range-Doppler subspaces, and embodiments that use only a single orthogonal or nearly orthogonal projection operation on a set of received signals to reduce the interference for a large class of signals. As used herein, the following terms have the following meanings. The term "matched projection" refers to a projection that reaches its maximum value when operating on the target signal, or signal of interest. The terms "orthogonal projection" and "mismatched projection" refer to a projection that is orthogonal to or nearly orthogonal to a matched projection. The term "image space" refers to a parameter space representation of the signal after the projection operation(s) has been performed.

The OSP approach of the invention also addresses the case where interference from one or more sources is present. Letting $\Pi_\rho$ and $\Pi_\theta$ denote initial parameter spaces and letting $\Omega_P$ and $\Omega_S$ denote image spaces, the signal function S and interference function J that map the parameter space $\Pi_\rho \times \Pi_\theta$ into the image space can be defined as:

$$S: \Pi_\rho \times \Pi_\theta : \Omega_P \times \Omega_S \subset \mathbb{C} \text{ Signal} \quad (1)$$

$$J: \Pi_\rho \times \Pi_\theta : \Omega_P \times \Omega_S \subset \mathbb{C} \text{ Interference} \quad (2)$$

$$SJ = S + J \text{ Signal plus interference} \quad (3)$$

A set of reference signal vectors is defined as $\overline{R} = [R_1 \ R_2 \ R_2 \ldots R_L]$, where $L \leq N$ and for each $i$ $R_i : \Pi_\rho \rightarrow \Omega_S \subset \mathbb{C}^N$, where $\rho_i \in \Pi_\rho$. $R_i$ can be formed as shifted versions of a reference signal R that is directly related to the signal S, where $\rho_i$ is related to the relative degree of mismatch associated with each $R_i$ and the reference vector R. The vector $\overline{\rho} = [\rho_1 \ \rho_2 \ \rho_3 \ldots \rho_L]$ determines the admissible parameters that define the pre-image space $\Pi_\rho^L \subset \mathbb{C}^L$. Also a set of vectors, $\overline{R}^\perp$, where each vector is orthogonal or nearly orthogonal to the vector R in $\mathbb{C}^N$ can be formed. Thus, $\overline{R}^\perp = [R_1^\perp \ R_2^\perp \ R_3^\perp \ldots R_K^\perp]$, where $K \leq N$ and $R_i^\perp$ are linearly independent. It should be noted that this is not the only way to create $\overline{R}^\perp$. Another example would be any set of K waveforms that are orthogonal or nearly orthogonal to R and linearly independent of one another. An operation can then be defined that takes the received signal and projects it into a space that is parallel to the reference vector. In addition, a set of operations can be defined that project the received signal into a set of spaces, each parallel to a vector $R_i^\perp$. A set of projection operations is defined as:

$$SP_i = R_i \cdot SJ : \Pi_\rho \times \Pi_\theta \rightarrow \Omega_S \subset \mathbb{C}^M \ i^{th} \text{ Matched Signal Projection} \quad (4)$$

$$JP_i = R_i^\perp \cdot SJ : \Pi_\rho \times \Pi_\theta \rightarrow \Omega_S \subset \mathbb{C}^M \ i^{th} \text{ Mis-Matched Projections} \quad (5)$$

For example, if the projection space is a space of orthogonal modulations, then R would be a reference modulation and $R_1^\perp$ could be a single orthogonal modulation to R and the remaining $R_i^\perp$ would be the N−1 circular shifts of $R_1^\perp$. Then, $\overline{SP}$ can be defined as:

$$\overline{SP} = \overline{R}^H \cdot (S+J) \subset \mathbb{C}^L \times \mathbb{C}^M, \quad (6)$$

where, ·, is a matrix multiply operation. The orthogonal projections are handled in a similar manner giving $$\overline{JP} = \overline{R}^{\perp H} \cdot (S+J) \subset \mathbb{C}^K \times \mathbb{C}^M \text{ Orthogonal projection.} \quad (7)$$

Note, matrix multiplying by all the shifts of R or $R_1^\perp$ are equivalent to the convolution, $\otimes$, of R or $R_1^\perp$ with (S+J).

Using the projected signal and the received signal to create the following outer products gives, $$Q(\overline{JP}) = \overline{JP}^H \overline{JP} \subset \mathbb{C}^M \times \mathbb{C}^M, \text{ and} \quad (8)$$

$$P(SJ) = SJ^H SJ \subset \mathbb{C}^M \times \mathbb{C}^M. \quad (9)$$

Q functions as a covariance matrix for the interference only using the multiple samples of R and $R^\perp$ that constitute a single processing interval. Thus, Q does not require a statistical process over multiple processing intervals. Similarly, P is the covariance of the original received signal, including the target signal and interference over a single processing interval. These variables are used to create an image space function, Y, that depends on the Q, P, and the separation parameters (possibly through a transformation V). For each $\theta_i \in \Pi_\theta$ let $\overline{\theta} = [\theta_1 \theta_2 \theta_3 \ldots \theta_K]$ denote a set of admissible parameters that defined the pre-image space $\Pi_\theta^K \subset \mathbb{C}^K$. Then the image space associated with the received signal:

$$Y = F(Q, P, V(\overline{\theta}), \overline{SP}(\overline{\rho})) \subset \mathbb{C}^L \times \mathbb{C}^K \text{ for each } \overline{\theta} \in \Pi_\theta^K, \overline{\rho} \in \Pi_\rho^L, \quad (10)$$

where for each j, $$V(\theta_j) : \Pi_\theta \to \Omega_S \subset \mathbb{C}^M \text{ Steering Vector} \quad (11)$$

is a vector that conforms to a priori signal structure in the image space, sometimes referred to as a steering vector. A detection function, D(Y), can be used to determine the parameters of the signal of interest. For example, if the detector is the absolute maximum function then applying the detection function over all projection and separation parameter values leads to the set of parameter values that optimize the signal reception, or $$\left[\widehat{\rho\theta}\right] = D(Y) \equiv \max_{\rho,\theta}(|Y|), \quad (12)$$

where $$\theta \in \prod_\theta$$

and $$\rho \in \prod_\rho.$$

It should be noted that the projection of the received signal that is orthogonal to, or nearly orthogonal to, the target signal, $\vec{JP}$, can be formed in a potentially large number of ways. That is, there are a large number of orthogonal, or nearly orthogonal, projection operations can be used to form $\vec{JP}$. It is equally valid, and useful in some cases, to combine many of these projections or even the inverted outer products from these projections to achieve further interference cancellation.

The signal can be reconstructed by $$S = S(\widehat{\rho}, \widehat{\theta}) : \Pi_\rho \times \Pi_\theta \to \Omega_P \times \Omega_S \subset \mathbb{C}^{N \times M}. \quad (13)$$

FIG. 1 is a block diagram of an illustrative embodiment of a system 100 for mitigating electromagnetic interference in a receiver where the orthogonal projection of the received signal is achieved by performing a mis-matched filter operation on the received signal to project it into an orthogonal image space. The system 100 includes an array 102 of spatially-separated antenna elements, an analog electrical circuit 104 and a digital processor 116. This array may have only a single antenna element. The analog electrical circuit 104 includes a low noise amplifier 106, a modulated reference generator 108, a mixer 110, a bandpass filter 112, and ADC circuitry 114. Each signal channel has one of the antenna elements of the array 102 and one of the electrical circuits 104 associated with it. It will be understood by those skilled there are multiple ways to accomplish this receiver. For ease of illustration, only one of the electrical circuits 104 is shown in FIG. 1.

The target signal is described by, $$\vec{S} = [S_1 S_2 \ldots S_M]^T \quad (14)$$

Similarly, the interference signal is represented by, $$\vec{J} = [J_1 J_2 \ldots J_M]^T \quad (15)$$

The actual signal received at the $k^{th}$ antenna element 102a is comprised of the sum of the target signal and the interference signal, which may be expressed mathematically as $S_k + J_k$. The system 100 operates as follows. An electrical signal is received at antenna element 102a. The antenna element 102a outputs an electrical signal (i.e., $S_k + J_k$) to amplifier 106. Amplifier 106 amplifies the electrical signal and delivers the amplified electrical signal to the mixer 110. The mixer 110 mixes the amplified electrical signal with a reference signal that is generated by the modulated reference generator 108. The signal exiting the mixer 110 passes through bandpass filter 112 and enters the ADC circuitry 114, which converts the analog signal into a digital signal. The digital signal is transferred to the processor 116 for interference mitigation processing, as will be described with reference to FIG. 2. The electrical circuit 104 and the processor 116 together form an electrical processing circuit for performing interference mitigation. A memory device 117 that is in communication with the processor 116 stores computer code for execution by the processor 116 and typically also stores data.

The memory device 117 may be any computer-readable medium capable of storing program code and data thereon, such as, for example, a RAM device, a ROM device, a PROM device, an EPROM device, a flash memory device, a CD, a DVD, a hard disk drive, a tape drive, and a memory card or stick. The processor 116 may be any type of processing device capable of processing computer code and data, such as, for example, a microprocessor, a microcontroller, a PGA, a PLA, an ASIC, an SOC, an SIP, a DSP, and a combination or two or more of such devices. As will now be described with reference to FIG. 2, the processor 116 performs an interference mitigation process that includes a mis-matched filtering operation that is used to project the received signal into an orthogonal image space and then uses information contained in the image space to remove interference from the received signal to obtain the target signal.

Figure 2:
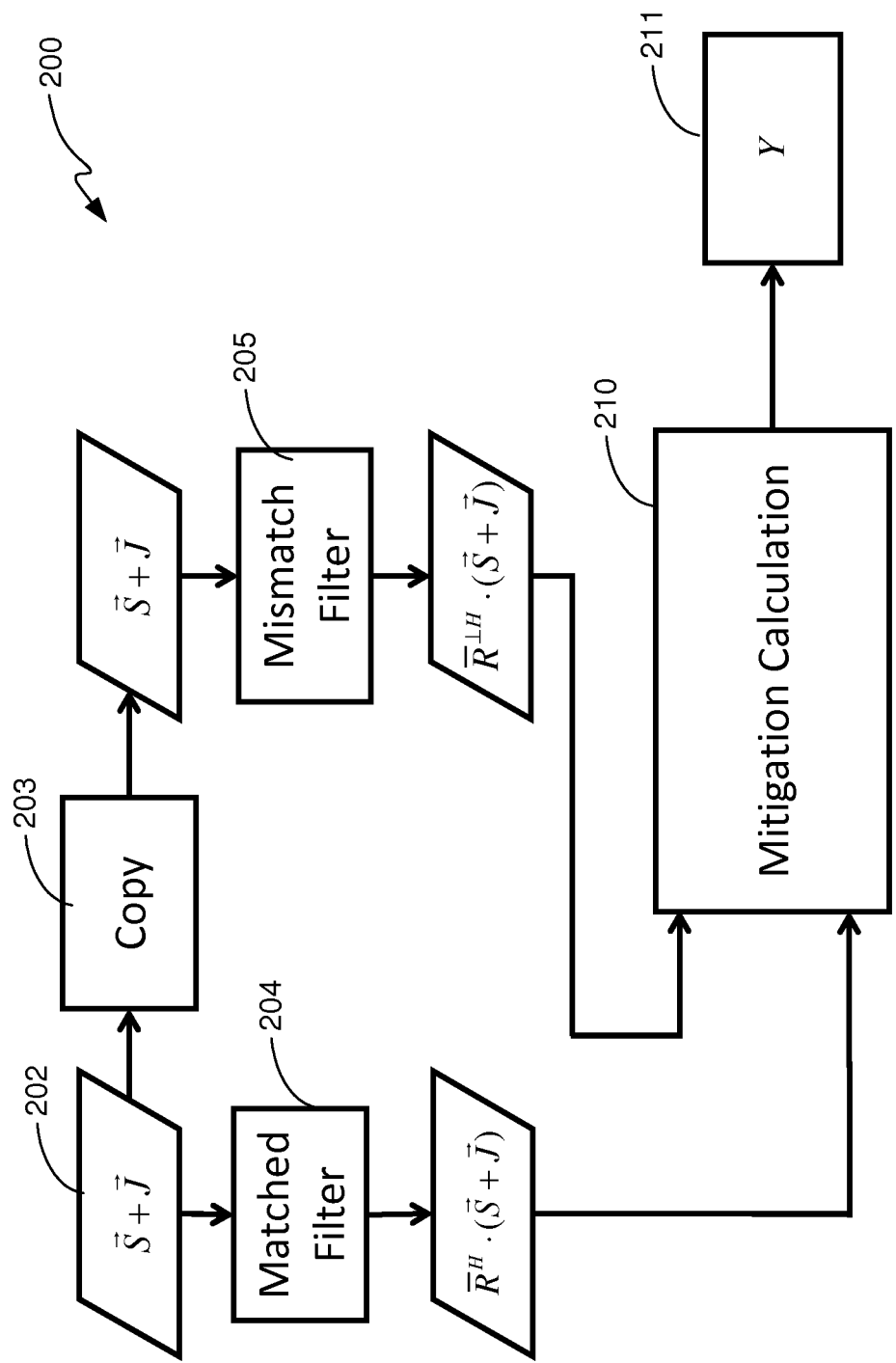
FIG. 2 is a processing flow diagram that demonstrates OSP method performed by the system shown in FIG. 1.

FIG. 2 is a flow diagram of the portion of the interference mitigation process 200 that is performed by the processor 116 shown in FIG. 1. The process begins with inputting the received signal $S_k + J_k$ into the processor 116 as the signal is outputted from the electrical circuit 104 shown in FIG. 1. This step is represented by block 202. At the step represented by block 203, a copy of the received signal is made. At the step represented by block 204, a matched filter sub-process is performed on the received signal to obtain the result $[R^H \cdot (\vec{S} + \vec{J})]$. At the step represented by block 205, a mis-matched filter sub-process is performed on the copy of the received signal to obtain the result $[R^{\perp H} \cdot (\vec{S} + \vec{J})]$. The symbol "·" in FIG. 2 represents a dot product mathematical operation.

At the sub-process represented by block 210, creates an image space, Y 211. One of a variety of methods may be used for this purpose. An example of the OSP method of the invention will be provided with reference to a Space Time Adaptive process known as Capon's Method, which uses the following equations:

$$W = Q^{-1}, \text{ and} \quad (16)$$

$$Y = \overline{SP}(\vec{\rho}) \cdot W^H \cdot V(\vec{\theta}). \quad (17)$$

In the traditional Capon's Method, Q is a covariance matrix that is computed over many processing intervals in order to build up the necessary statistics. This processing assumes that the signal and the interference stay statistically stationary over these intervals. However, in accordance with an illustrative embodiment of the invention, Q is computed over a single processing interval, thereby removing the time delay and the stationary requirement. Because Y is linear in V, an efficient way to calculate Y is to compute the DFT of $\overline{SP} \cdot W^H$.

In the case where the projection space is the fast time modulation and the image space is the angle space, then S and J can be expressed as:

$$S: \Pi_{range} \times \Pi_{angle} \to \Omega_{f\_fast\_time} \times \Omega_{f\_spatial} \subset \mathbb{C}^{N} \times \mathbb{C}^{M}, \quad (18)$$

$$J: \Pi_{range} \times \Pi_{angle} \to \Omega_{f\_fast\_time} \times \Omega_{f\_spatial} \subset \mathbb{C}^{N} \times \mathbb{C}^{M} \quad (19)$$

After detection, this algorithm resolves into $$[\hat{\rho}\hat{\theta}] = \max(DFT(\overline{SP}^H \cdot Q^{-1})), \quad (20)$$

Thus, the process performed by the system 100 depicted in FIG. 1 can include the modified Capon's Method algorithm represented by equations 16 and 17 that processes information over a single processing interval to mitigate interference in the target signal.

Alternatively, assuming that the projection space is the fast time modulation and that the image space is the product of the fast and slow time Doppler Space, then S, J, and Y can be expressed as:

$$S: \Pi_{range} \times \Pi_{Doppler} \to \Omega_{f\_fast\_time} \times \Omega_{f\_slow\_time} \subset \mathbb{C}^{N} \times \mathbb{C}^{M}, \quad (21)$$

$$J: \Pi_{range} \times \Pi_{Doppler} \to \Omega_{f\_fast\_time} \times \Omega_{f\_slow\_time} \subset \mathbb{C}^{N} \times \mathbb{C}^{M} \quad (22)$$

The image space is formed as follows, $$Y = \overline{SP}(\vec{\rho}) \cdot W^H \cdot V(\vec{\theta}) \quad (23)$$

Again the Discrete Fourier Transform (DFT) can be used for the image space which in this case is called the Range-Doppler (RD) map.

$$RD = DFT(\overline{SP}^H \cdot W) \quad (24)$$

As an example of yet another alternative, it is also possible to utilize the OSP technique in implementing other conventional adaptive array algorithms that require a covariance matrix P for the signal plus interference and the covariance matrix Q for the orthogonal complement to the signal plus interference.

Using the above formalism, several known adaptive array processing algorithms, such as, for example, the Generalized Sidelobe Canceller (GSC) algorithm and the Minimum Variance Distortionless Response (MVDR) canceller algorithm can be reformulated to perform the OSP method of the invention. In addition, persons of skill in the art will understand how to extend these results to eigenstructure-based techniques utilizing eigenvectors and eigenvalues associated with the matrices P and Q. The following demonstrates the manner in which these algorithms can be modified to achieve the OSP approach of the invention.

Modified Minimum Variance Distortionless Response $$W = \frac{Q^{-1}}{V^H \cdot P^{-1} \cdot V} \quad (25)$$

$$Y = \overline{SP}(\vec{\rho}) \cdot W^H \cdot V(\vec{\theta}) \quad (26)$$

$$[\hat{\rho}\hat{\theta}] = \max_{\rho,\theta}(|Y|) \quad (27)$$

Notice that Y is not linear in V, so the DFT would not work to compute the image space.

Modified Generalized Sidelobe Canceller $$W_q = V(\theta_q) \text{ Look direction} \quad (28)$$

Define B as the M×M−1 dimensional space orthogonal to Wq $$W_q^H \cdot B = 0_{1 \times (M-1)} \quad (29)$$

$$W_a = W_q \cdot P \cdot B(BPB)^{-1} \quad (30)$$

$$W = W_q^H - BW_a^H = W_q^H - B(W_q \cdot P \cdot B(BPB)^{-1})^H = (I - B(B^H \cdot P^H B^H)^{-1} B^H P^H) V^H \quad (31)$$

$$Y = \overline{SP}(\vec{\rho}) \cdot W^H \quad (32)$$

$$[\hat{\rho}\hat{\theta}] = \max_{\rho,\theta}(|Y|) \quad (33)$$

The embodiments described above make use of an observation that the received signal has both temporal and spatial properties that make it possible to filter the signal into separate, respective filtered signals that are orthogonal to one another. The spatial property may be, for example, angle or range. The temporal property may be, for example, code division multiple access (CDMA), time division multiple access (TDMA) or frequency division multiple access (FDMA). The received signal is sampled in both dimensions and then filtered into the matched-filtered signal and into the mis-matched-filtered signal, which is orthogonal to, or nearly orthogonal to, the matched-filtered signal. The interference signal is present in both the matched-filtered signal and the mis-matched-filtered signal whereas the target signal is present in only the matched-filtered signal. In the matched-filtered signal, the interference signal is different from the matched-filtered signal in the temporal property, but is the same as the matched-filtered signal in the spatial property. The aforementioned image space, Y is obtained by processing the match-filtered signal and the mis-matched-filtered signal in accordance with a method such as those presented above to separate the target signal S from the interference signal J.

It should be noted that the invention has been described with reference to a few illustrative, or exemplary, embodiments in order to demonstrate the principles and concepts of the invention. It will be understood by those skilled in the art that the invention is not limited to these embodiments, but may be modified in a number of ways while still achieving the goals of the invention. For example, the circuit elements, logic or processes described above with reference to FIGS. 1 and 2 may be different from those that are explicitly disclosed. For example, while the system 100 shown in FIG. 1 includes an array of antenna elements 102, the OSP process could be performed using a single antenna element. Also, while the OSP process depicted in FIG. 2 has been described as being performed almost entirely within the processor 116, some of the tasks could instead be performed in analog circuitry, such as the matched and mis-matched filtering operations represented by blocks 204 and 205. Persons skilled in the art will understand, in view of the description being provided herein, these and other modifications may be made while still achieving the goals of the invention and without deviating from the scope of the invention.

What is claimed is:

1. A system for mitigating electromagnetic interference, the system comprising:
M antenna elements, where M is a positive integer; and
M processing circuits electrically coupled to the M antenna elements, the M processing circuits receiving a digital representation of an electrical signal from a respective one of the M antenna elements, the electrical signal including a target signal and an interference signal and performing a first projection operation on the digital representation of the electrical signal to create a matched projection space parallel to a reference related to a target signal and a second projection operation on the electrical signal to create an orthogonal projection space that is orthogonal to, or nearly orthogonal to, the matched projection space, the orthogonal projection space including the interference signal, but not the target signal, and
wherein at least one of the M processing circuits uses the orthogonal projection space and the matched projection space to separate the interference signal from the target signal.

2. The system of claim 1, wherein at least two of the M processing circuits uses angle.

3. The system of claim 1, wherein the at least one of the M processing circuits uses Doppler.

4. The system of claim 1, wherein each projection operation uses code division multiple access (CDMA) codes.

5. The system of claim 1, wherein each projection operation uses time division multiple access (TDMA) time slots.

6. The system of claim 1, wherein each projection operation use frequency division multiple access (FDMA) frequencies.

7. The system of claim 1, wherein the at least one of the M processing circuits separates the interference signal from the target signal prior to formation of an image space.

8. The system of claim 1, wherein the at least one of the M processing circuits separates the interference signal from the target signal after formation of an image space.

9. The system of claim 1, wherein the at least one of the M processing circuits executes a Minimum Variance Distortionless Response algorithm that has been modified to use a covariance derived from an orthogonal projection space.

10. The system of claim 1, wherein the at least one of the M processing circuits executes a Generalized Sidelobe Canceller algorithm that has been modified to use a covariance derived from an orthogonal projection space.

11. The system of claim 1, wherein M=1.

12. The system of claim 1, wherein M is greater than or equal to 2.

13. The system of claim 1, wherein the at least one of the M processing circuits uses time-of-arrival.

14. The system of claim 1, wherein the at least one of the M processing circuits uses polarization.

15. A method for mitigating electromagnetic interference comprising:
with an array of M spatially-separated antenna elements, receiving electromagnetic signals, where M is a positive integer;
receiving an electrical signal from a member of the array of M spatially separated antenna elements, the electrical signal including a target signal component and an interference signal component;
using a matched digital filter to perform at least a first projection operation on the electrical signal to create a matched projection space parallel to a reference related to a target signal and using a mismatched digital filter to perform a second projection operation on the electrical signal to create an orthogonal projection space that is orthogonal to, or nearly orthogonal to, the matched projection space, the orthogonal projection space including the interference signal component, but not the target signal component; and
using a processor to perform a separation method that separates the interference signal component from the target signal component.

16. The method of claim 15, wherein the separation method uses angle.

17. The method of claim 15, wherein the separation method uses Doppler.

18. The method of claim 15, wherein each projection operation uses code division multiple access (CDMA) codes.

19. The method of claim 15, wherein each projection operation uses time division multiple access (TDMA) time slots.

20. The method of claim 15, wherein each projection operation use frequency division multiple access (FDMA) frequencies.

21. The method of claim 15, wherein the separation method separates the interference signal component from the target signal component prior to formation of an image space.

22. The method of claim 15, wherein the separation method separates the interference signal component from the target signal component after formation of an image space.

23. The method of claim 15, wherein the separation method includes a Minimum Variance Distortionless Response algorithm that has been modified to use a covariance derived from the orthogonal projection spaces.

24. The method of claim 15, wherein the separation method includes a Generalized Sidelobe Canceller algorithm that has been modified to use a covariance derived from the orthogonal projection spaces.

25. The method of claim 15, wherein M=1.

26. The method of claim 15, wherein M is greater than or equal to 2.

27. The method of claim 15, wherein the separation method uses time-of-arrival.

28. The method of claim 15, wherein the separation method uses polarization.

29. A non-transitory computer-readable medium having computer code stored thereon for execution by a processor to perform mitigation of electromagnetic interference, the computer code comprising:
a first code segment that receives a digital representation of a plurality of electrical signals that have been received by respective antenna elements of an array of M spatially-separated antenna elements, where M is a positive integer;
a second code segment that projects the digital representation of the plurality of electrical signals into a space that is parallel to a reference vector and an orthogonal projection space that is orthogonal to, or nearly orthogonal to, the reference vector, wherein a respective target signal and a respective interference signal are present in the digital representation of the plurality of electrical signal signals and wherein the respective interference signal, but not the respective target signal, is present in the orthogonal projection space; and
a third code segment that performs a separation method that separates the respective interference signal from the respective target signal.

30. The non-transitory computer-readable medium of claim 29, further comprising:
a fourth code segment that performs a matched filter sub-process operation on the plurality of electrical signals to project the respective received electrical signal into a matched space that is matched to, or nearly matched to, the respective reference vector.

31. The non-transitory computer-readable medium of claim 29, wherein the respective interference signal is separated from the respective target signal after formation of an image space.

32. The non-transitory computer-readable medium of claim 29, wherein the respective interference signal is separated from the respective target signal before formation of an image space.

* * * * *